United States Patent [19]

Kuwabara et al.

[11] Patent Number: 4,778,271
[45] Date of Patent: Oct. 18, 1988

[54] PHOTOELETRIC TYPE MEASURING METHOD AND DEVICE

[75] Inventors: Yoshiharu Kuwabara; Hiroyoshi Hamada; Masayuki Kuwata, all of Kanagawa, Japan

[73] Assignee: Mitutoyo Mfg. Co., Ltd., Tokyo, Japan

[21] Appl. No.: 25,619

[22] Filed: Mar. 13, 1987

Related U.S. Application Data

[63] Continuation-in-part of Ser. No. 770,394, Aug. 28, 1985, abandoned, Continuation-in-part of Ser. No. 484,150, Apr. 12, 1983, abandoned.

[30] Foreign Application Priority Data

Apr. 14, 1982 [JP] Japan .................................. 57-62058

[51] Int. Cl.$^4$ ............................................. G01B 11/08
[52] U.S. Cl. ..................... 356/386; 250/560
[58] Field of Search ............... 356/384, 385, 386, 387; 250/560

[56] References Cited

U.S. PATENT DOCUMENTS 3,853,406 12/1974 Zanoni ................................. 356/387
4,129,384 12/1978 Walker et al. ...................... 356/387

Primary Examiner—R. A. Rosenberger
Attorney, Agent, or Firm—Koda and Androlia

[57] ABSTRACT

In a photoelectric type measuring method and device wherein a workpiece to be measured is scanned by parallel scanning ray beams for scanning in one direction, aforesaid ray beams after the scanning are received by light receiving elements and a time length of a dark portion or a bright portion generated due to the obstruction of a portion of the ray beams by workpiece to be measured in response to output signals from the light receiving elements is detected so as to obtain the dimension in the scanning direction of the workpiece to be measured, the aforesaid ray beams are split into ray beams polarized in directions different from each other, the workpiece to be measured is scanned in such a condition that the two ray beams are relatively shifted so that the two ray beam may be partially overlapped in the scanning directions thereof and light receiving signals corresponding to the two ray beams after the scanning are processed to detect and edge of the workpiece to be measured.

3 Claims, 2 Drawing Sheets

PHOTOELETRIC TYPE MEASURING METHOD AND DEVICE

This is a continuation-in-part of application Ser. No. 770,394, filed Aug. 28, 1985, now abandoned, which is in turn a continuation-in-part of application Ser. No. 484,150, filed Apr. 12, 1983, now abandoned.

BACKGROUND OF THE INVENTION

1. Field of the Invention

This invention relates to a photoelectric type measuring method and device, and more particularly to improvements in a photoelectric type measuring method and device, wherein parallel scanning ray beams are utilized to measure dimensions of a workpiece to be measured.

2. Description of the Prior Art

Heretofore, there has been adopted a photoelectric type measuring device wherein rotary scanning ray beams (laser beams) are converted by a collimator lens into parallel scanning ray beams to be passed through this collimator lens and a condensing lens, a workpiece to be measured is interposed between the collimator lens and the condensing lens, and dimensions of the workpiece to be measured are measured from the time length of a dark portion or a bright portion generated due to the obstruction of the parallel scanning ray beam by the workpiece to be measured.

More specifically, as shown in FIG. 1, laser beams 12 are oscillated from a laser tube 10 toward a stationary mirror 14, the laser beams 12 thus reflected are converted into scanning beams 17 by a rotary mirror 16, the scanning beams 17 are converted into parallel scanning ray beams 20 by a collimator lens 18, a workpiece 24 to be measured interposed between the collimator lens 18 and a condensing lens 22 is scanned at high speed by the parallel scanning ray beams 20, and dimensions in the scanning direction (direction Y) of the workpiece 24 to be measured are measured from the time length of a dark portion or a bright portion generated due to the obstruction of the parallel scanning ray beams by the workpiece 24 to be measured.

The bright and dark portions of the parallel scanning ray beams 20 are detected as variations in output voltage of a light receiving element 26 disposed at the focal point of the condensing lens 22. Signals from the light receiving element 26 is fed to a pre-amplifier 28, where they are amplified (Refer to v), and then, fed to a segment selector circuit 30. This segment selector circuit 30 is adapted to generate a voltage V to open a gate circuit 32 only for a time t, during which the workpiece 24 to be measured is scanned, from the time of the voltage output of the light receiving element 26 and feeds the same to the gate circuit 32. A continuous clock pulse CP is fed to this gate circuit 32 from a clock pulse oscillator circuit 34, whereby the gate circuit 32 generates clock pulses P for counting the time t corresponding to the dimensions in the scanning direction, for example, the outer diameter of the workpiece 24 to be measured and feeds the same to a counter circuit 36. Upon counting the clock pulses P, the counter circuit 36 feeds a count signal to a digital indicator 38, where the dimensions in the scanning direction, i.e., the outer diameter of the workpiece 24 to be measured is digitially indicated.

In FIG. 1, designated at reference numeral 40 is a synchronous sine wave oscillator circuit, 42 a power amplifier and 44 a synchronous motor. The synchronous motor 44 rotates the rotary mirror 16 in synchronism with the clock pulses in response to synchronous signals fed from the synchronous sine wave oscillator circuit 40 in response to the continuous clock pulses CP fed from the clock pulse oscillator circuit 34, whereby the measuring accuracy is maintained.

The above-described measuring method and device have been widely utilized because the lengths, thickness and the like of moving workpiece and workpiece heated to high temperature can be measured at high accuracies in non-contact relationship therewith.

However, the diameter of the laser beams 12 in the abovedescribed high speed scanning type laser length measuring device is about 0.8-1 mm, thus causing a measuring error of 1 mm at the maximum in that condition.

In consequence, in order to reduce the diameter of the laser beams adjacent a boundary of the workpiece 24 to be measured, there has heretofore been adopted a means of measuring by use of a lens having its focal point at the boundary portion. Even in this case, it is difficult to reduce the diameter of the laser beams 12 to less than 0.08 mm, thus causing a measuring error of 0.08 mm at the maximum due to the diameter of the laser beams.

In contrast thereto, if the boundary of the workpiece to be mueasured in detected by a cross point between an output signal from a light receiving element 26 and a reference voltage, then the measuring error may be reduced to about 1 $\mu$m at the maximum. In this case, however, there is presented such a disadvantage that the aforesaid measuring errors fluctuate through a change in light quantity of the laser beams 12 due to fluctuations in voltage and the like and a change in distance from the collimator lens 18 to the workpiece 24 to be measured and the like.

SUMMARY OF THE INVENTION

It is therefore the primary object of the present invention to provide a photoelectric type measuring method and device, wherein an edge of a workpiece to be measured and be accurately detected with a simplified arrangement.

Another object of the present invention is to provide a photoelectric type measuring method and device, wherein measurement can be conducted with high accuracy and at high speed without being affected by a change in light quantity of laser beams or a change in distance from a collimator lens to a workpiece to be measured.

A further object of the present invention is to provide a photoelectric type measuring method and device, wherein a rate of change in wave form outputs for detecting an edge is desirably adjusted, so that the measuring accuracy can be desirable improved as necessary and the edge can be accurately detected even when high speed scanning is conducted.

To the above end, according to the present invention, in a photoelectric type measuring method wherein a workpiece to be measured is scanned by parallel scanning ray beams for scanning in one direction, the aforesaid ray beams after the scanning are received by light receiving elements, and a time length of a dark portion or a bright portion generated due to the obstruction of a portion of the aforesaid ray beams by the workpiece to be measured in response to output signals from the aforesaid light receiving elements is detected so as to obtain the dimension in the scanning direction of the workpiece to be measured, the aforesaid ray beams comprise two ray beams polarized in directions different from each other, the workpiece to be measured is scanned in such a condition that the two ray beams are relatively shifted so that the two ray beams may be partially overlapped in the scanning directions thereof and light receiving signals corresponding to the two ray beams after the scanning are processed to detect the edge of the workpiece to be measured.

To the above end, according to the present invention, in a photoelectric type measuring device comprising a parallel scanning ray beam generator for generation ray beams to scan in one direction and light receiving elements for detection darkness or brightness of the aforesaid ray beams which have been passed through a workpiece to be measured, wherein a time length of a dark portion or a bright portion generated due to the obstruction of a portion of the aforesaid ray beam by the workpiece to be measured which is disposed between the parallel scanning ray beam generator and the aforesaid light receiving elements is detected so as to obtain the dimension in the scanning direction of the workpiece to be measured, the aforesaid parallel scanning ray beam generator is arranged such that a pair of ray beams generated by a beam generating member are polarized in directions different from each other and partially overlapped with each other to scan said workpiece to be measured, and said device further comprises:

a separating means for separating said pair of ray beams after scanning said workpiece to be measured in directions corresponding to the directions of polarization; light receiving elements for respectively receiving the separated ray beams separated by said separating means; and an operational processing unit for processing output signals from said light receiving elements and specifying one point in the overlapped portion between said pair of ray beams.

To the above end, according to the present invention, in the aforesaid photoelectric type measuring device, the beam generating member in the parallel scanning ray beam generator are converted into two beam generating members for generating separate ray beams, respectively.

To the above end, according to the present invention, in the aforesaid photoelectric type measuring device, a single beam generating member in provided in the parallel scanning ray generator and said parallel scanning ray beam generator comprises: a beam splitting mirror for splitting the ray beams emitted from said beam generating member into two directions; polarizing means for polarizing the ray beams split by said beam splitting mirror in directions different from each other; a phase difference forming means for shifting said split ray beams in phase within a range of a diameter of the ray beams before said split ray beams are polarized by said polarizing means; and a jointing means for joining said split ray beams thus shifted in phase so that said ray beams can be partially overlapped with each other to scan said workpiece to be measured.

To the above end, according to the present invention, in the aforesaid photoelectric type measuring device, the aforesaid operational processing unit includes differentiation circuits for differentiating output signals from the light receiving elements in response to the separated ray beams, a differential circuit for calculating a difference between the outputs signals from these differentiation circuits and a discriminator circuit for discriminating a point in the aforesaid overlapped portion.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENT

Detailed description will hereunder be given of the embodiment of the present invention with reference to the drawings.

Figure 1:
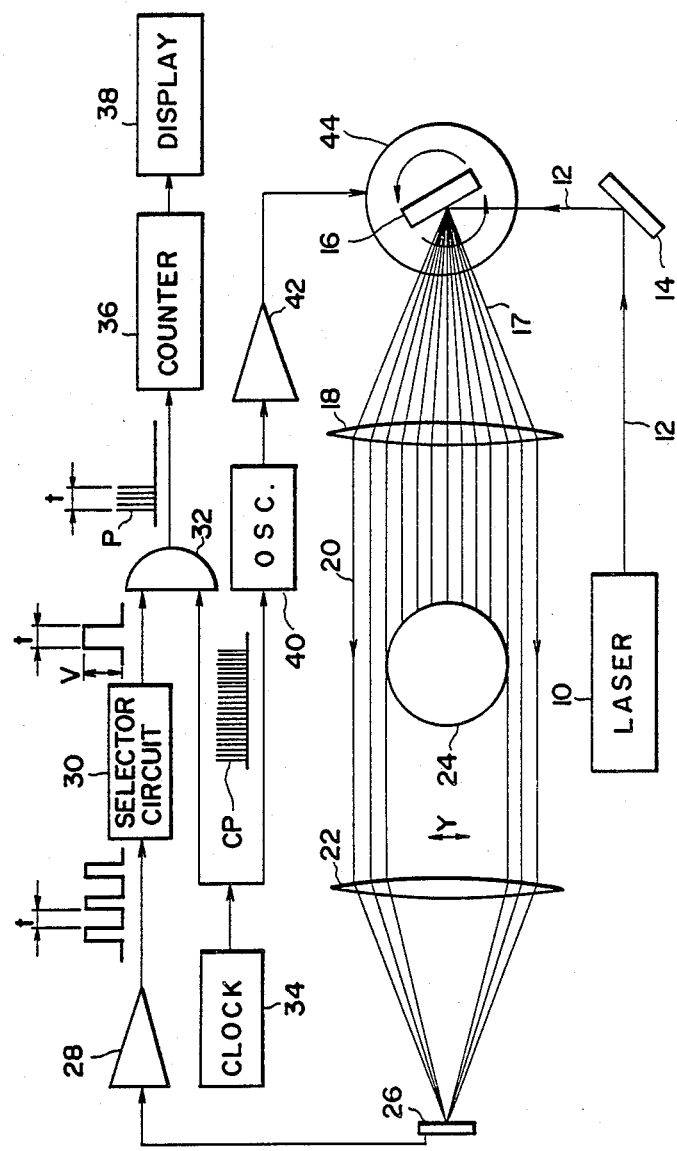
FIG. 1 is a block diagram showing the photoelectric type measuring device using the parallel ray beams in the prior art.
Figure 2:
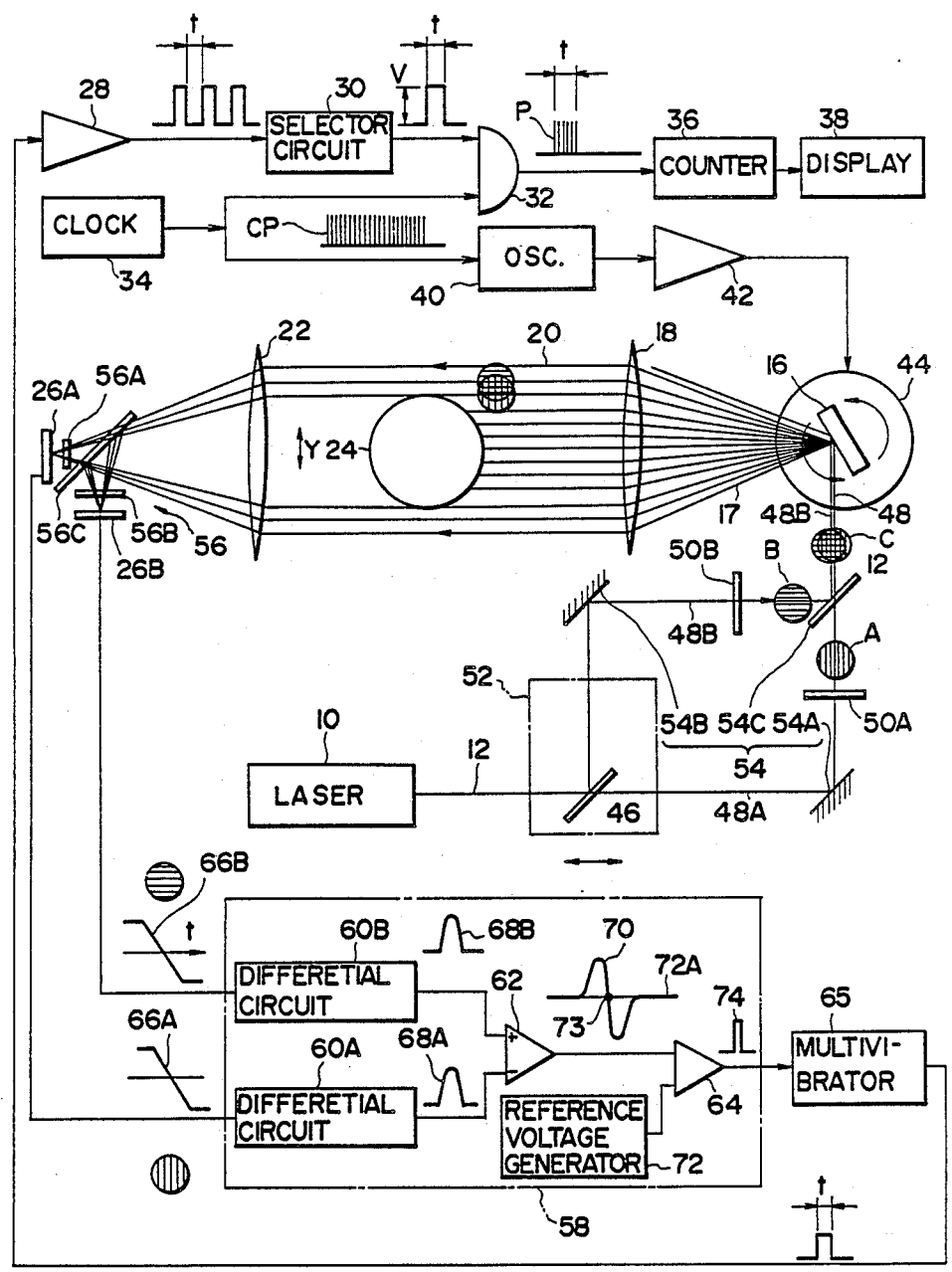
FIG. 2 is a block diagram showing an embodiment of the photoelectric type measuring device according to the present invention.

As shown in FIG. 2, according to this embodiment, in a photoelectrical type measuring device similar to the one shown in FIG. 1, the measuring device, a parallel scanning ray beam generator having a laser tube 10, a stationary mirror 14, a rotary mirror 16 and a collimetor lens 18, further includes: a beam splitting mirror 46 for splitting laser beams emitted from the laser tube 20 as being a beam generating member into two directions; polarizing means 50A and 50B for polarizing ray beams 48A and 48B thus split by this beam splitting mirror 46 into directions different from each other; a phase difference forming means 52 for shifting the aforesaid split ray beams 48A and 48B in phase before being polarized by the polarizing means 50A and 50B; and a joining means 54 for joining the split ray beams 48A and 48B thus shifted in phase so that the split ray beams 48A and 48B can be partially overlapped with each other to scan the workpiece 24 to be measured; and the measuring device further comprising: a separating means 56 for separating the ray beams after the scanning of the workpiece 24 to be measured into two corresponding to the aforesaid split and polarized ray beams 48A and 48B; light receiving elements 26A and 26B for respectively receiving the separated ray beams separted by aforesaid separating means; and an operational processing unit 58 for processing output singals from these light receiving elements 26A and 26B to specify point in an overlapped portion of the aforesaid split ray beams 48A and 48B.

The aforesaid beam splitting mirror 46 is formed of a half mirror disposed at an angle of 45° to a photoelectric type axis of the ray beams 12 so as to split the ray beams 12 emitted from the laser tube 10 into two directions perpendicular to each other.

The aforesaid polarizing means 50A and 50B are formed of polarizing filters for polarizing the split ray beams 48A and 48B split by the beam splitting mirror 46 so that the directions of polarization become perpendicular to each other.

The phase difference forming means 52 is constructed so as to drive the beam splitting mirror 46 reciprocately along the ray beams 12 emitted from the laser tube 10.

The aforesaid joining means 54 comprises: mirrors 54A and 54B for reflecting the split ray beams 48A and 48B split by the beam splitting mirror 46 into directions perpendicular to each other to make those split ray beams to cross at a point perpendicularly; and a half mirror 54C disposed at an angle of 45° to the optical axis of the split ray beams 48A and 48B reflected by these mirrors 54A and 54B near at an intersection of these ray beams. The beam splitting mirror 46 and the mirror 54A are disposed at an angle of 45° to the optical axis of the ray beams 12.

The aforesaid separating means 56 comprises: a half mirror 56C for separating the ray beams, which have scanned the workpiece 24 to be measured and are being condensed through a condensing lens 22, into two directions perpendicular to each other; a polarizing filter 56A for polarizing the ray beams which have been passed through this half mirror 56C; and a polarizing filter 56B for polarizing the separated ray beams reflected by the half mirror 56C in a direction perpendicular to the direction of polarizing of the half mirror 56A.

The aforesaid operational processing unit 58 comprises: differentiation circuits 60A and 60B for respectively differentiating output signals from the light receiving elements 26A and 26B of the separated ray beams; a differential circuit 62 for caluculating a difference between output signals form the differentiation circuit 60A and 60B; and a discriminator circuit 64 for comparing an output signal from the differential circuit 62 with a reference signal, discriminating a point in an overlapped portion between the split ray beams 48A and 48B and emitting a predetermined pulse signal.

The device further includes a bistable multivibrator 65 having a period of t. The input of multivibrator 65 is connected to the output of discriminator circuit 64 and the output of multivibrator 65 is supplied to the input of amplifier 28.

Description will hereunder be given of action of the device of the above embodiment.

The ray beams 12 emitted from the laser tube 10 is split into the split ray beams 48A and 48B. If the beam splitting mirror 46 is moved toward the laser tube 10 by the phase difference forming means 52, the split ray beams 48B is moved with the beam splitting mirror 46 simultaneously.

Therefore, reflecting points of the split ray beams 48B at the mirror 54B and the half mirror 54C are moved upwardly in FIG. 2.

After being joined by the joining means 54, the split ray beams 48A and 48B are slightly shifted and almost overlapped each other as indicated by reference numeral C in FIG. 2.

Therefore, in scanning the workpiece 24 to be measured after being convertd into the parallel scanning ray beams by the rotary mirror 16, the split ray beams 48B scans the workpiece 24 to be measured slightly in advance of the split ray beams 48A.

A part of the ray beams refracted by the condensing lens 22 upon completion of scanning of the workpiece 24 to be measured is passed through the half mirror 56C and the polarizing filter 56A and reaches the light receiving element 26A, and the remaining part thereof is reflected perpendicularly in the lateral direction by the half mirror 56C, passed through the polarizing filter 56B and reaches the light receiving element 26B.

At this time, by selecting the directing of polarization of the polarizing filter 56A, only the beams corresponding to the aforesaid split ray beams 48A can be passed toward the light receiving element 26A.

The ray beams reflected by the half mirror 56C are passed through the polarizing filter 56B for polarizing the ray beams in a direction perpendicular to the direction of polarization of this polarizing filter 56A and reach the light receiving element 26B, whereby the ray beams received by this light receiving element 26B correspond to the aforesaid split ray beams 48B.

When these split ray beams are received by the light receiving elements, an output signal from the light receiving element 26B assumes a wave form indicated by reference numeral 66B in FIG. 2, and an output signal from the light receiving element 26A assumes a wave form indicated by reference numeral 66A, and the wave form 66A has a shift on time axis to the wave form 66B by a phase difference formed by the aforesaid phase difference forming means 52.

The signal indicated by the wave form 66B is differentiated by the differentiation circuit 60B in the operational processing unit 58 and the signal indicated by the wave form 66A is differentiated by the differentiation circuit 60A, respectively, and signals indicated by the wave forms 68B and 68A are emitted from the both differentiation circuits 60B and fed to the differential circuit 62.

The differential circuit 62 determines a phase difference therebetween, forms a wave form signal indicated by reference numeral 70 and feeds the same to the discriminator circuit 64.

A reference voltage indicataed by a wave form 72A is fed to the discriminator circuit 64 from a reference voltage generator 72, whereby the discriminator circuit 64 detects a cross point 73 between this signal and the signal indicated by the wave form 70, and then, emits a pulse signal 74.

In consequence, one point, where this pulse signal 74 is emitted, indicates an accurate boundary of the workpiece 24 to be measured. In addition, the output of discriminator circuit 64 triggers the multivibrator 65 to supply pulses of period t to the preamplifier 28.

In the above embodiment, the two ray beams to scan the workpiece being measured are formed by splitting the original ray beams, however, this invention need not necessarily be limited to this arrangement, but, this arrangement may be replaced by one in which two ray beams polarized into directions different from each other may form a phase difference therebetween in a manner to partially overlap with each other, so as to scan the workpiece to be measured.

Therefore, for example, the latter arrangement is also applicable to the case where two ray beams emitted from two parallel scanning ray beam sources are polarized in directions different from each other and partially overlapped to form a phase difference, to thereby scan the workpiece to be measured.

Furthermore, in the above embodiment, the phase difference forming means 52 is constructed to drive the beam splitting means 46 reciprocately along the ray beam 12, to thereby form a phase difference between the split ray beams 48A and 48B. However, the invention should not be limited to the arrangement which substantially forms a phase difference beteen these split ray beams 48A and 48B. For example, the phase difference forming means 52 is constructed to drive the mirror 54B reciprocately along the line perpendicular to the optical axis of the ray beams 12.

It should be apparent of those skilled in the art that the above-described embodiments are merely representative, which represent the applications of the principles of the present invention. Numerous and varied other arrangement can be readily devices by those skilled in the art without departing from the spirit and the scope of the invention.

What is claimed is:

1. A photoelectric type measuring device comprising a parallel scanning ray beam generator for generating ray beams to scan in one direction and a light receiving element or elements for detecting darkness or brighness of said ray beams being passed through a workpiece to be measured, wherein a time length a dark portion or a bright portion generated due to the obstruction of a portion of said ray beams by said workpiece to be measured which is disposed between said parallel scanning ray beam generator and said light receiving element or elements is detected so as to obtain the dimension in the scanning direction of said workpiece to be measured, characterized in that said parallel scanning ray beam generator is arranged such that a pair of ray beams generated by a beam generating member are polarized in directions different from each other and partially overlapped with each other in the scanning direction to scan said workpiece to be measured, and said device further comprises: a separating means for separting said pair of ray beams after scanning said workpiece to be measured in directions corresponding to the directions of polarization; light receiving elements for respectively receiving the separated ray beams separated by said separating means; an operational processing unit for processing output signals from said light receiving elements and specifying one point in the overlapped portion between said pair of ray beams; and wherein said operational processing unit comprises: differential circuits for differentiating output signal emitted from said light receiving elements in response to said separator ray beams; a differential circuit for calculating a difference between the output signals from said differentiating circuit; and a discriminator circuit for comparing an output signal from said differential circuit with a reference signal and discriminating one point in said overlapped portion.

2. A photoelectric type measuring device as set forth in claim 1, wherein said beam generating member in the parallel scanning ray beam generator is constructed of two beam generating members for generating separate ray beams, respectively.

3. A photoelectric type measuring device as set forth in claim 1, wherein a single beam generating member is provided in the parallel scanning ray generator and said parallel scanning ray beam generator comprises: a beam splitting mirror for splitting the ray beams emitted from said beam generating member into two directions; polarizing means for polarizing the ray beams split by said beam splitting mirror in directions different from each other; a phase difference forming means for shifting said split ray beams in phase within a range of a diameter of the ray beams before said split ray beams are polarized by said polarizing means; and a joining means for joining said split ray beams thus shifted in phase so that said ray beams can be partially overlapped with each other to scan said workpiece to be measured.

* * * * *